United States Patent [19]
Dominé

[11] Patent Number: 5,362,347
[45] Date of Patent: Nov. 8, 1994

[54] FUSION BONDED THERMOPLASTIC LEADING EDGE FOR AIRCRAFT AERODYNAMIC SURFACES

[75] Inventor: Christophe A. Dominé, Filton, Great Britain

[73] Assignee: British Aerospace Public Limited Company, London, England

[21] Appl. No.: 932,297

[22] Filed: Aug. 19, 1992

[30] Foreign Application Priority Data

Aug. 23, 1991 [GB] United Kingdom ............... 9118186

[51] Int. Cl.⁵ .................. B29C 69/00; B32B 31/04; B32B 31/20
[52] U.S. Cl. .................. 156/214; 156/212; 156/242; 156/245; 156/297; 156/298; 156/379.8; 264/241; 264/247; 264/248; 264/251; 264/258; 264/259; 264/263; 264/271.1; 264/277; 264/DIG. 64
[58] Field of Search ............ 156/245, 297, 379.8, 156/201, 298, 212, 214, 221, 222, 242; 264/241, 247, 248, 251, 258, 263, 271.1, 277, 259, DIG. 64

[56] References Cited
U.S. PATENT DOCUMENTS

| | | | |
|---|---|---|---|
| 2,749,266 | 6/1956 | Eldred | 156/297 |
| 4,086,378 | 4/1978 | Kam et al. | 156/245 |
| 4,492,607 | 1/1985 | Halcomb | 156/242 |
| 4,657,615 | 4/1987 | Braun et al. | |
| 4,721,593 | 1/1988 | Kowal | 264/258 |
| 4,882,118 | 11/1989 | Megarry | 264/248 |
| 4,937,032 | 6/1990 | Krone et al. | 264/258 |
| 4,995,931 | 2/1991 | Duthie | 264/248 |
| 5,064,705 | 11/1991 | Donovan, Sr. | 156/245 |
| 5,096,526 | 3/1992 | Engwall | 156/245 |

FOREIGN PATENT DOCUMENTS 0296283 12/1988 European Pat. Off. .
8501678 1/1987 Netherlands .

OTHER PUBLICATIONS

Navy Technical Disclosure Bulletin, vol. 9, No. 2, Dec. 1983, Arlington US pp. 93–98, W. J. Wallace 'Composite Air Foil, Navy Tech. Cat. No. 0164, Navy Case No. 66779'.

*Primary Examiner*—Michael Ball
*Assistant Examiner*—Adrienne C. Johnstone
*Attorney, Agent, or Firm*—Cushman, Darby & Cushman

[57] ABSTRACT

An aircraft wing, a fusion bonded thermoplastic fixed leading edge structure for aircraft aerodynamic surfaces and a method of manufacture are provided. The fixed leading edge structure comprises a leading edge skin (28), one or more aerodynamic profile defining stiffening members (17, 18) spaced spanwise therewithin and a sub-spar. Each of the components are of low modulus consolidated composite material and the leading edge skin (28) is attached to the stiffening members (17, 18) and to the sub-spar by a fusion-bonding thermoplastic process.

2 Claims, 6 Drawing Sheets

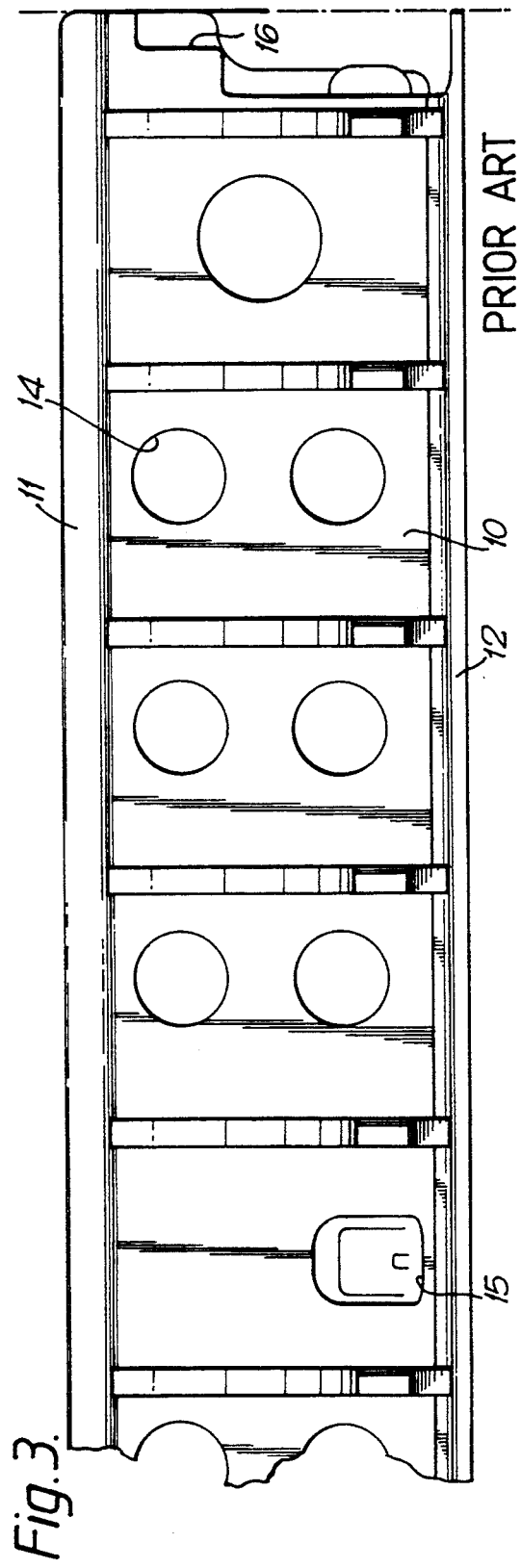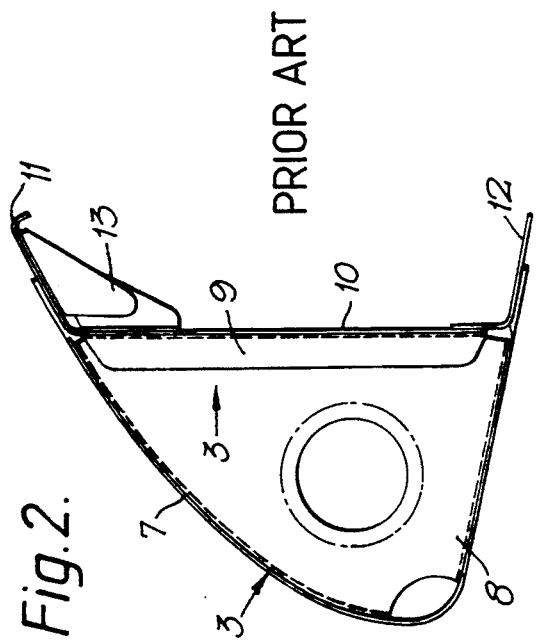

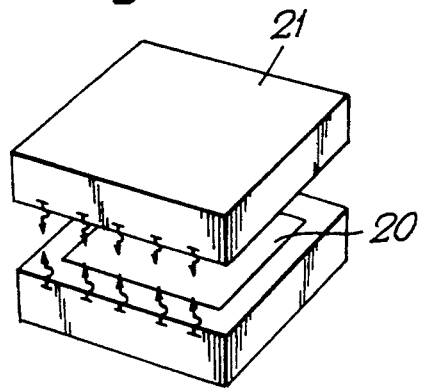
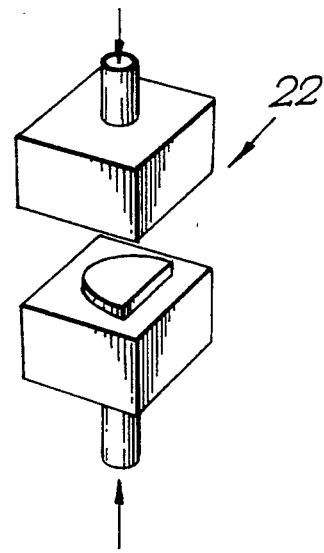
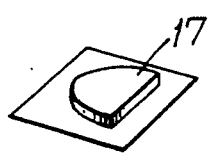
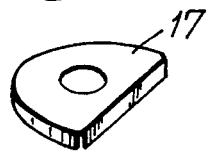
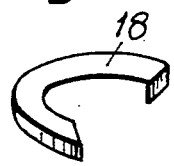
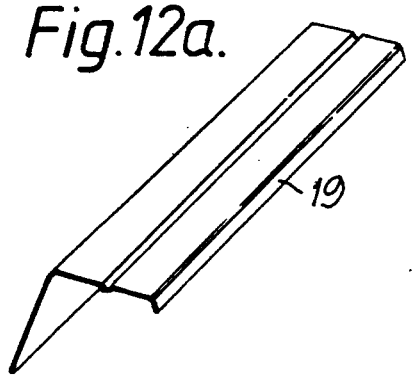
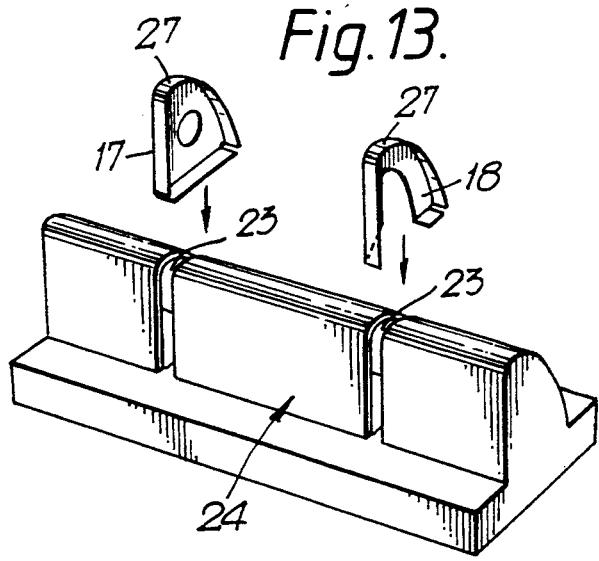
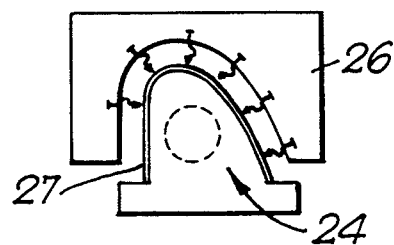

FUSION BONDED THERMOPLASTIC LEADING EDGE FOR AIRCRAFT AERODYNAMIC SURFACES

BACKGROUND TO THE INVENTION

This invention relates to fusion-bonded thermoplastic leading edges for aircraft aerodynamic surfaces. More particularly, though not exclusively, it relates to load-carrying fixed leading edges for aircraft and a method of manufacture for such leading edges.

The term "fixed leading edge" is generally understood to mean those leading edge structures positioned forwardly of the wing front spar, which do not in themselves generally define the forward aerodynamic profile of the wing but provide mounting and support for leading edge high lift devices, e.g. slats, and are therefore load carrying structures. They are thus distinguished from those leading edges which are merely fairings defining the forward aerodynamic boundary of the wing although the method of manufacture of the present invention may be equally applicable to such leading edges.

DESCRIPTION OF THE PRIOR ART

Fixed leading edges of conventional fabricated metal construction frequently employ higher modulus material, e.g. aluminium lithium, as a consequence of which there may be a necessary complication in the design to avoid stress peaks in the leading edge structure induced by wing bending as will be later described.

OBJECTS OF THE INVENTION

It has been recognised that if a material of lower modulus such as a glass fibre composite is employed, aluminium lithium having a modulus four times that of glass fibre composite, then a lighter, simpler and more cost effective structure will result. It is therefore one object of the present invention to provide such an improved fixed leading edge structure.

It is a further object of the present invention to provide a method of manufacture for a load carrying fixed leading edge of fusion-bonded thermoplastic composite construction.

It is yet a further object of the present invention to provide an aircraft wing including a fixed leading edge structural assembly manufactured from fusion-bonded thermoplastic composite material which further includes means for minimising the effects of lightning strike.

SUMMARY OF THE INVENTION

According to one aspect of the present invention there is provided a fusion bonded thermoplastic fixed leading edge structure for aircraft aerodynamic surfaces including a leading edge skin, one or more aerodynamic profile defining riblets or stiffeners positioned at spanwise spaced-apart locations within said leading edge skin and a spanwise extending sub-spar each of the component parts being of low modulus consolidated composite material, said leading edge skin being attached to said riblets or stiffeners and to said sub-spar by a fusion-bonding thermoforming process.

According to a further aspect of the present invention there is provided a method of manufacture for a fusion bonded thermoplastic fixed leading edge structure for aircraft aerodynamic surfaces including the steps of:

pressure forming from pre-heated low modulus consolidated thermoforming composite material one or more riblets or stiffeners having at least one aerodynamic profile defining flange, placing said riblets or stiffeners in a leading edge profile defining male forming tool such that the aerodynamic profile defining flange of the riblets or stiffeners substantially conforms to the profile of the said male forming tool, heating said profile flanges, simultaneously pre-heating a sheet of consolidated thermoplastic composite a pre-determined amount, placing said sheet upon said male forming tool and pressure forming said sheet to conform to the profile of the male forming tool and the profile flanges of the riblets or stiffeners such that they are fusion bonded to said formed sheet to define a leading edge sub-assembly, pressure forming a sub-spar assembly having spanwise upper and lower attachment booms and a spar web, of low modulus thermoplastic consolidated composite material, at least the upper attachment boom being separately formed but attached to said spar web by a fusion-bonded process, and welding said leading edge sub-assembly to said sub-spar assembly at least at its upper and lower boom attachments whereby a fusion-bonded leading edge structural assembly is obtained.

According to yet a further aspect of the present invention there is provided an aircraft wing including a fixed leading edge structural assembly said wing including, a wing structural box including at least a front spar, a rear spar and upper and lower aerodynamic skin profiles, a trailing edge structure located rearwards of the rear spar and, a fixed leading edge structure extending forwardly of said front spar, said fixed leading edge structural assembly being manufactured from low modulus fusion-bonded thermoplastic composite material to minimise stress peaks induced by wing bending.

BRIEF DESCRIPTION OF THE DRAWINGS

One embodiment of the present invention will now be described, by way of example only, and with reference to the accompanying drawings in which:

FIG. 2 illustrates, in more detail, the fabricated leading edge assembly of FIG. 1.

FIG. 3 is a view on the false spar of the leading edge assembly viewed in direction of Arrow 3 in FIG. 2.

FIG. 8–12a inclusive illustrate stages in the manufacture of thermoformed component parts.

FIG. 13–16 inclusive illustrate stages in the manufacture of the fusion bonded leading edge sub-assembly.

DESCRIPTION OF PREFERRED EMBODIMENT

Figure 1:
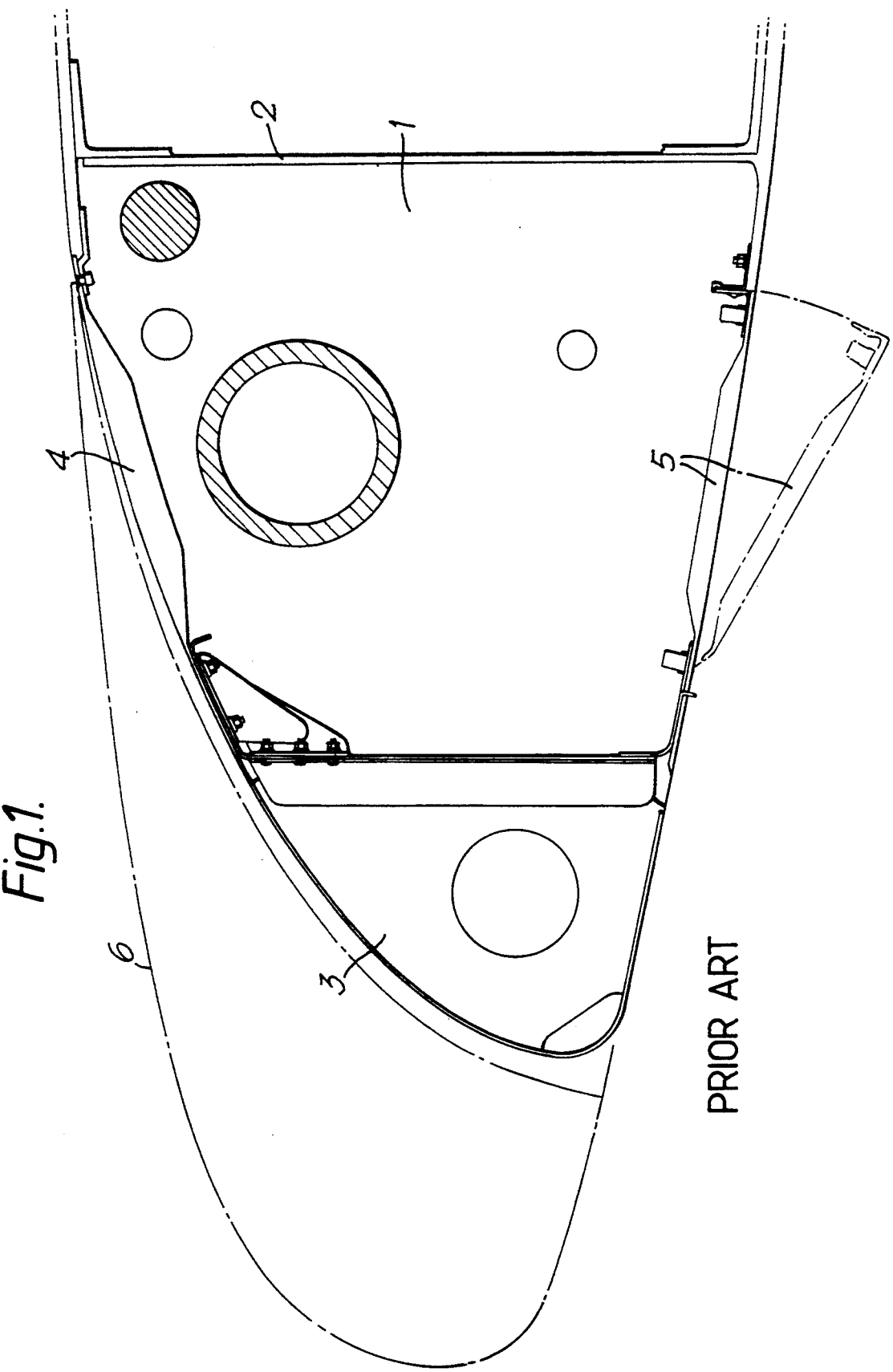
FIG. 1 is a side elevation on a wing fixed leading edge structure of conventional fabricated construction.
Figure 4:
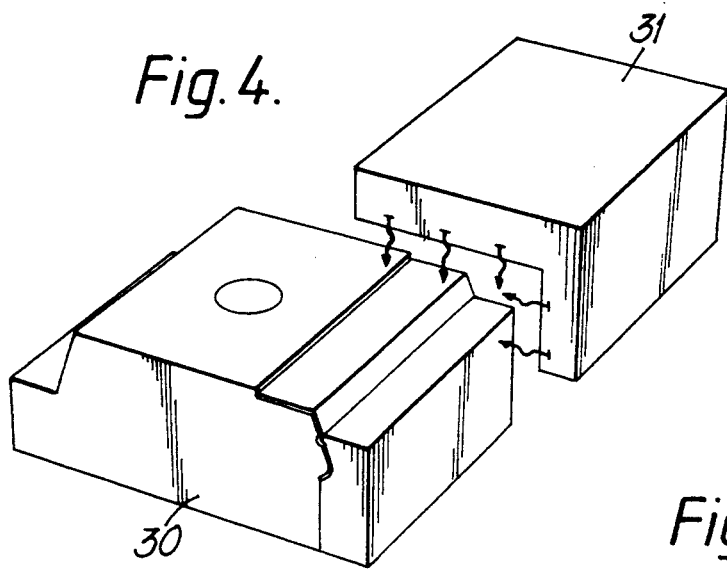
FIG. 4–7 inclusive illustrate stages in the manufacture of a fusion bonded thermoplastic false spar.
Figure 5:
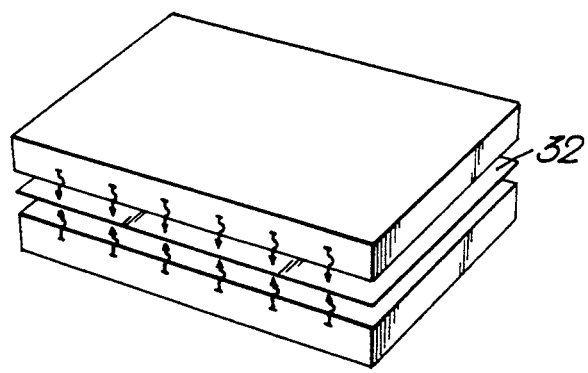
Figure 6:
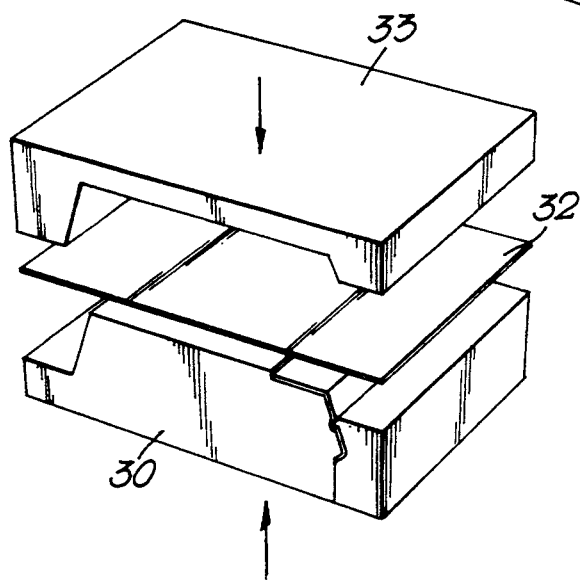
Figure 7:
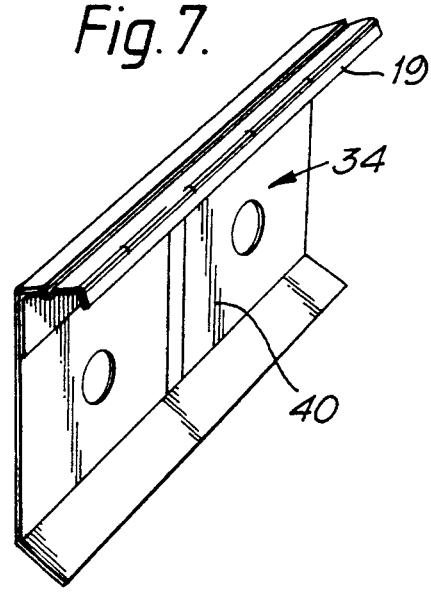
Figure 15:
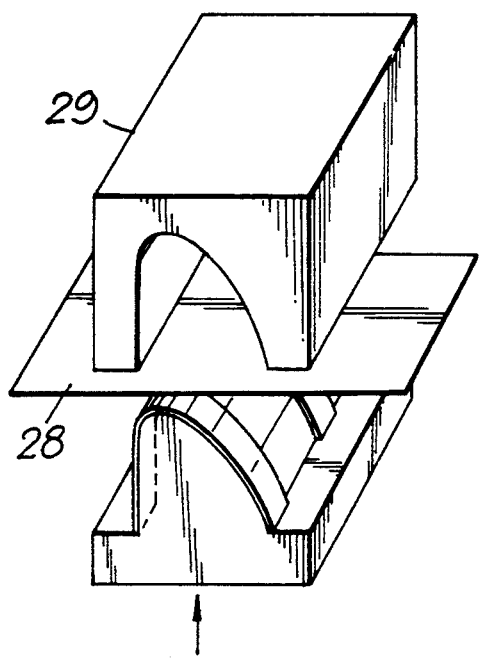
Figure 16:
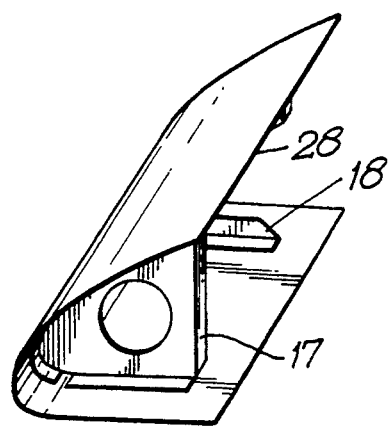
Figure 17:
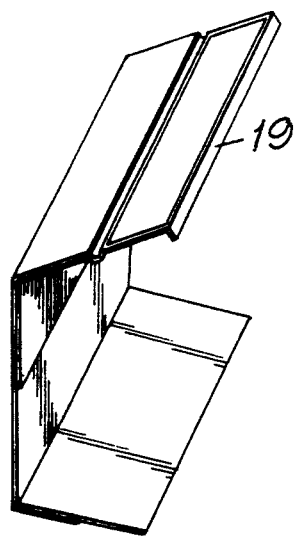
FIG. 17 and 18 inclusive illustrate the preparation and installation of the false spar in the sub-assembly of FIG. 16.

Referring to the drawings, FIG. 1 illustrates a typical cross-section through a wing fixed leading structure 1 extending forwardly of the wing front spar 2 and includes a leading edge D-nose structure 3 and upper and lower closing panels 4 and 5 respectively. Shown in broken line is a leading edge slat 6.

The D-nose structure shown is of conventional metal fabricated construction as more clearly illustrated in FIGS. 2 and 3, for example manufactured from aluminium/lithium alloys. The nose skin 7, chemi-etched between the lands is formed around riblets 8 defining the aerodynamic profile, the riblets being attached by angles 9 to the sub-spar 10. This sub-spar includes upper and lower flanges 11 and 12 respectively providing a landing for the nose skin 7 and for the closing panels 4 and 5. The upper flange 11 is supported at each riblet station by means of corner bracket assemblies 13. The sub-spar web includes a series of lightening holes 14 and miscellaneous cut-outs 15 and 16 along its length for reasons not discussed here. It will be noted that the whole assembly is riveted in single rows and staggered pitching and the riblet spacings are typically 192 mm.

One of the shortcomings with aluminium-lithium alloy, for example, is that it is a high modulus material, being four times that of glass fibre composite material. With a higher modulus material the need to avoid stress peaks in the leading edge structure induced by wing bending complicates the design. Hence the use of low modulus material could lead to a lighter and simpler structure. There is a further complication in conventional fabricated structures in the necessary use of large numbers of rivets.

The main asset of thermoplastic resin is cost effective processing to achieve a large integrated single item structure. The manufacturing principle is based on the thermo-forming process. Due to the reversibility of thermoplastic resins it has been found possible to press-form with adequate heat and pressure the D-nose skin while incorporating simultaneously pre-formed riblets and stiffeners located in a heated tool. Only a few minutes were required to produce a typical, say 1.8 meter long D-nose section, with all riblets and stiffeners being fusion bonded to the skin in a single manufacturing operation.

This cost effective jointing process enables a reduction of riblet pitch and hence a thinner skin whilst still maintaining the aerodynamic profile. A similar process is applicable to the sub-spar and the upper and lower spar booms.

The thermo-forming process is used to convert a flat consolidated laminate into a complex shape with no change to the starting laminate thickness. When applied to the D-nose manufacture several stage steps are involved in the manner now to be described.

Referring to FIGS. 8–12a inclusive, thermo-forming of secondary components such as riblets 17, stiffener 18 and sub-spar upper boom 19 is carried out by a similar process. For example FIGS. 8–11 inclusive show the manufacture of riblets 17 by pre-heating laminate 20 in an infra-red oven 21 to a temperature of 345° C. and quickly transferred to a moulding press 22 where it is formed at 100–200 psi. Cycle times are between 2 and 10 minutes depending on material thickness and part geometry. Components are subsequently trimmed to fully finished shape.

Referring to FIGS. 13–16 inclusive, riblets 17 and stiffeners 18 are located in slots 23 of a thermo-forming tool 24 on which the D-nose skin 28 will be shaped. It should be noted that although a one-piece forming tool is illustrated by way of example this may, of necessity, be a multi-element tool in order to accommodate the riblets and stiffeners and to allow their subsequent withdrawal. As shown in FIG. 14 this tool is placed in an infra-red oven 26 such that the attachment flanges 27 are heated, the remainder of the components protected from the heat by the thermal mass of the tool 24.

Simultaneously, a consolidated laminate 28 to form the D-nose skin is also heated in an infra-red oven, not shown, and on completion of the heating cycle, transferred to a forming fixture, comprising the thermo-forming tool 24 and a matching female tool 29 (FIG. 15) where it is pressed to shape the main D-nose skin. The heated flanges of the secondary components (17, 18) fusion bond to the laminate when the pressure is applied.

The tool must preferably be designed as a multi-element arrangement to support the flanges 27 thereby giving minimal distortion when pressure is applied. It should be noted that the thermoplastic parts located in the tool are re-processed by applying heat on their flanges with no degradation in material properties. The tool is finally dismantled and the assembly (FIG. 16) can undergo finishing operations.

Preferably, the consolidated laminate forming the D-nose skin 28 incorporates a lightning strike aluminium mesh or foil.

Now referring to FIGS. 4–7 inclusive, the sub-spar upper boom 19 is located within a multi-element base forming tool 30 and its attachment surface heated by partial enclosure in an infra-red heating apparatus 31. Simultaneously, a further consolidated laminate 32 constituting a sub-spar web is preheated in the infra-red apparatus of FIG. 5 and subsequently transferred to the forming tool 30, pressure forming being applied by the upper tool element 33 whereby the upper boom 19 is fusion bonded to it and a lower attachment flange is integrally formed to give a sub-spar assembly 34.

Preferably an aluminium foil 40 is bonded on the inside part of the sub-spar assembly to prevent the direct and indirect effect of lightning in the proximity of sensitive electrical control systems and cable runs when the leading edge structure is installed upon the wing.

Figure 18:
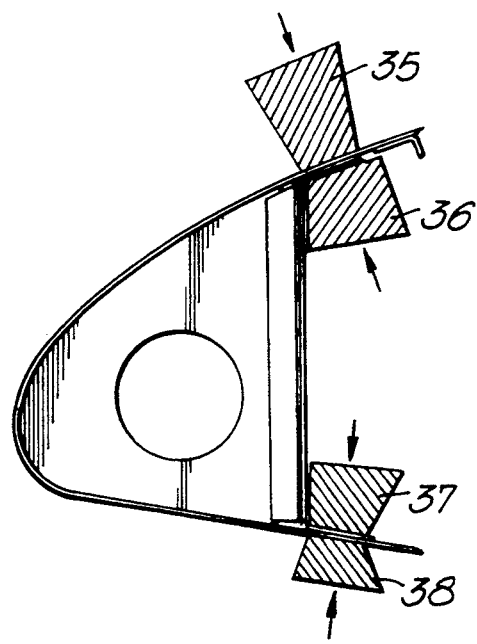

In the final assembly of the sub-spar to the D-nose sub-assembly, the riblets 17 and stiffeners 18 are bolted to the sub-spar assembly 34 whilst the D-nose sub-assembly and the sub-spar assembly 34 are joined together by fusion bonding the upper and lower booms as shown in FIG. 18. One method of carrying this out is by means of pressure blocks 35, 36, 37 and 38 and the use of resistance implant welding. Induction Welding is an alternative method with rollers (not shown) replacing the blocks.

Figure 19:
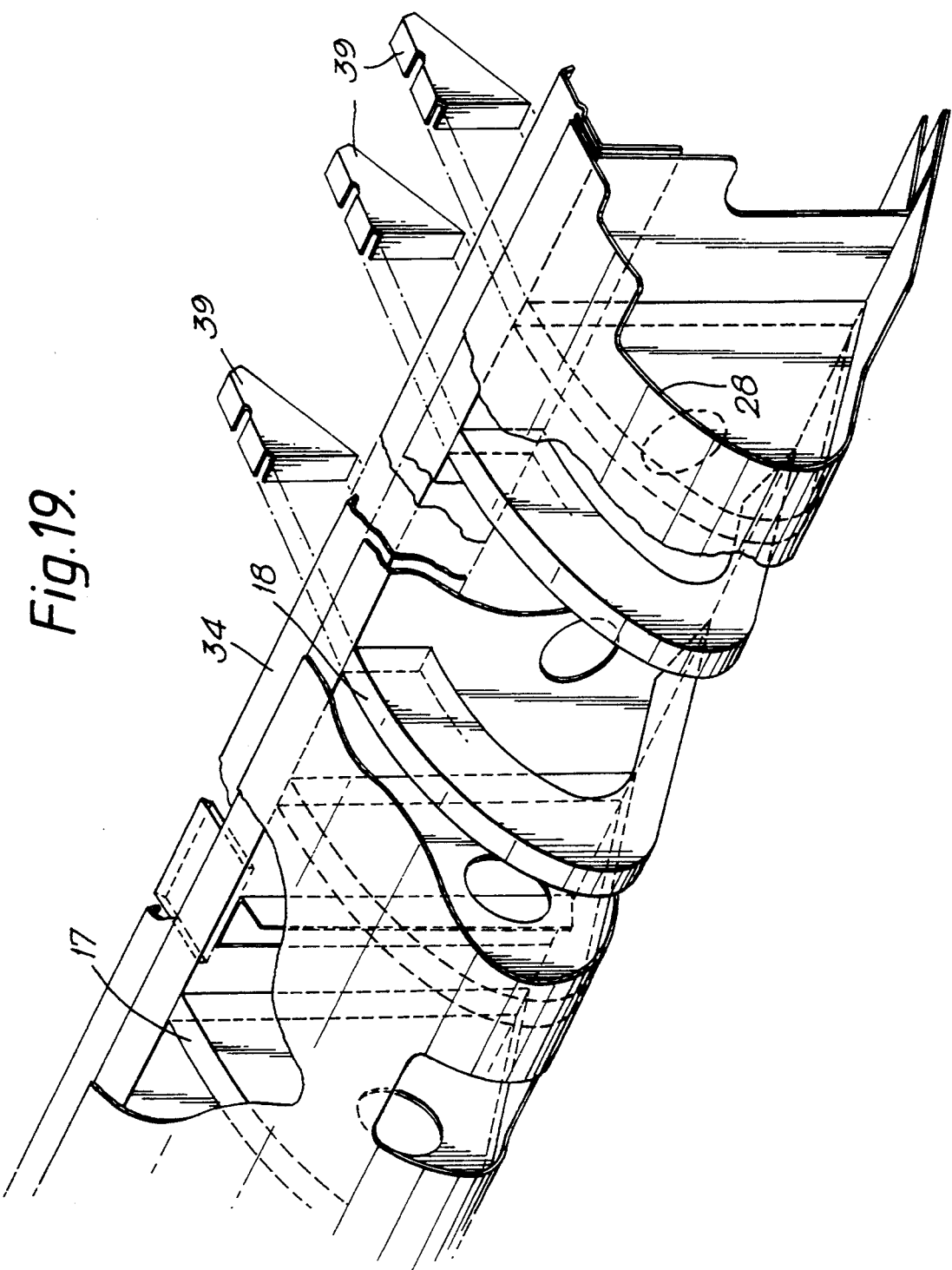
FIG. 19 illustrates, pictorially, a typical leading edge assembly in accordance with the present invention.

FIG. 19, cut-away for clarity, illustrates pictorially a typical D-nose structure assembly. Not shown elsewhere are upper landing brackets 39 which are located inside the sub-spar upper boom. Although not shown in position these landing brackets are assembled to provide sufficient conductivity between the underlying aluminium mesh of the D-nose skin, the sub-spar aluminium foil and the airframe.

Although the present embodiment and particularly FIG. 13 merely illustrates the use of one riblet and one stiffener, this is merely by way of example and the numbers of component parts will of course be determined by structural and aerodynamic requirements.

I claim:

1. A method of manufacturing a fusion-bonded thermoplastic fixed leading edge structure for aircraft aerodynamic surfaces including the steps of:

pressure forming at least one stiffening member from preheated low modulus thermoplastic composite material, said stiffening member having a main portion and at least one profile flange;

placing said at least one stiffening member in a forming tool having a predetermined thermal mass;

heating and pressure forming a sheet of thermoplastic composite material so that it conforms in shape to said at least one profile flange;

heating said at least one profile flange so as to fusion bond said sheet of thermoplastic composite material thereto to define a leading edge sub-assembly;

utilizing the thermal mass of said forming tool to protect said main portion of said at least one stiffening member from heat;

forming a sub-spar having spanwise upper and lower attachment booms and a spar web from a low modulus thermoplastic composite material; and welding said leading edge sub-assembly to said sub-spar at least at said upper and lower attachment booms.

2. A method of manufacture according to claim 1, wherein the step of forming the sub-spar further comprises the steps of:

pressure forming said upper boom attachment and said spar web, and fusion bonding said upper attachment boom to the spar web.

* * * * *